United States Patent

[11] 3,557,918

| [72] | Inventors | Akira Akima<br>Tokyo;<br>Kazuyoshi Yoshida; Shigeo Ujihara,<br>Saitama-ken, Japan |
|---|---|---|
| [21] | Appl. No. | 802,603 |
| [22] | Filed | Feb. 26, 1969 |
| [45] | Patented | Jan. 26, 1971 |
| [73] | Assignee | Honda Giken Kogyo Kabushiki Kaisha<br>Chuo-ku, Tokyo, Japan |

[54] APPARATUS FOR CONTROLLING THE OPERATION OF A SHIFT MEMBER AND INPUT CLUTCH IN A GEAR TYPE TRANSMISSION
2 Claims, 4 Drawing Figs.

[52] U.S. Cl. ................................................. 192/3.57
  192/4, 192/85
[51] Int. Cl. ................................................. F16d 67/00
[50] Field of Search ............................................. 192/3.5(FP),
  3.5(FPE), 3.5(FR)

[56] References Cited
UNITED STATES PATENTS

| 2,189,679 | 2/1940 | Sanford | 192/3.5FR |
| 3,344,896 | 10/1967 | Rasmussen | 192/3.5FP |
| 3,386,543 | 6/1968 | Osburn | 192/3.5FP |
| 3,422,939 | 1/1969 | Biabaud | 192/3.5FPE |

*Primary Examiner* — Benjamin W. Wyche III
*Attorney* — Waters, Roditi, Schwartz & Nissen

ABSTRACT: An operating cylinder for a shift member is supplied with pressure fluid from a source thereof by the manual operation of a valve, the shift member being connected to a piston in the cylinder and being displaced by the pressure fluid thereby to displace the shift member to an operative position. A rod connects the piston and shift member and is provided with a groove which serves to deliver pressure fluid to a passage leading to an operating cylinder of a clutch only when the piston approaches the end of its stroke and the shift member has been brought to operative position.

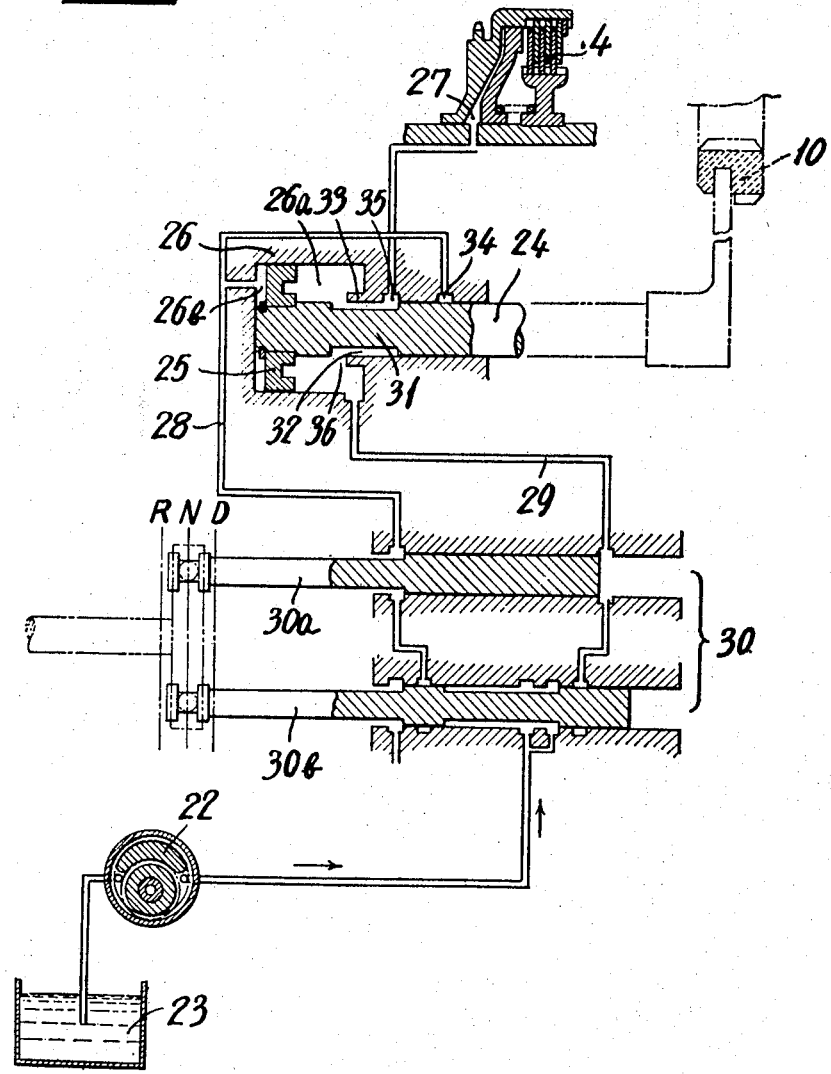

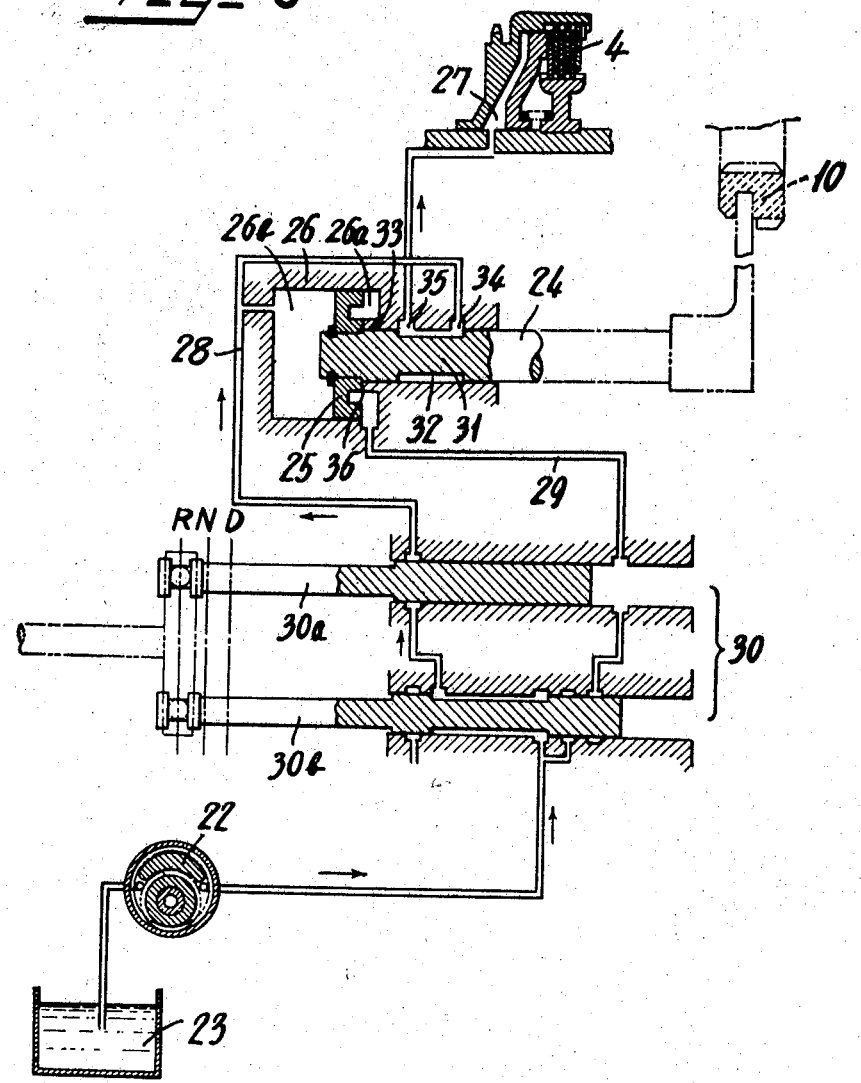

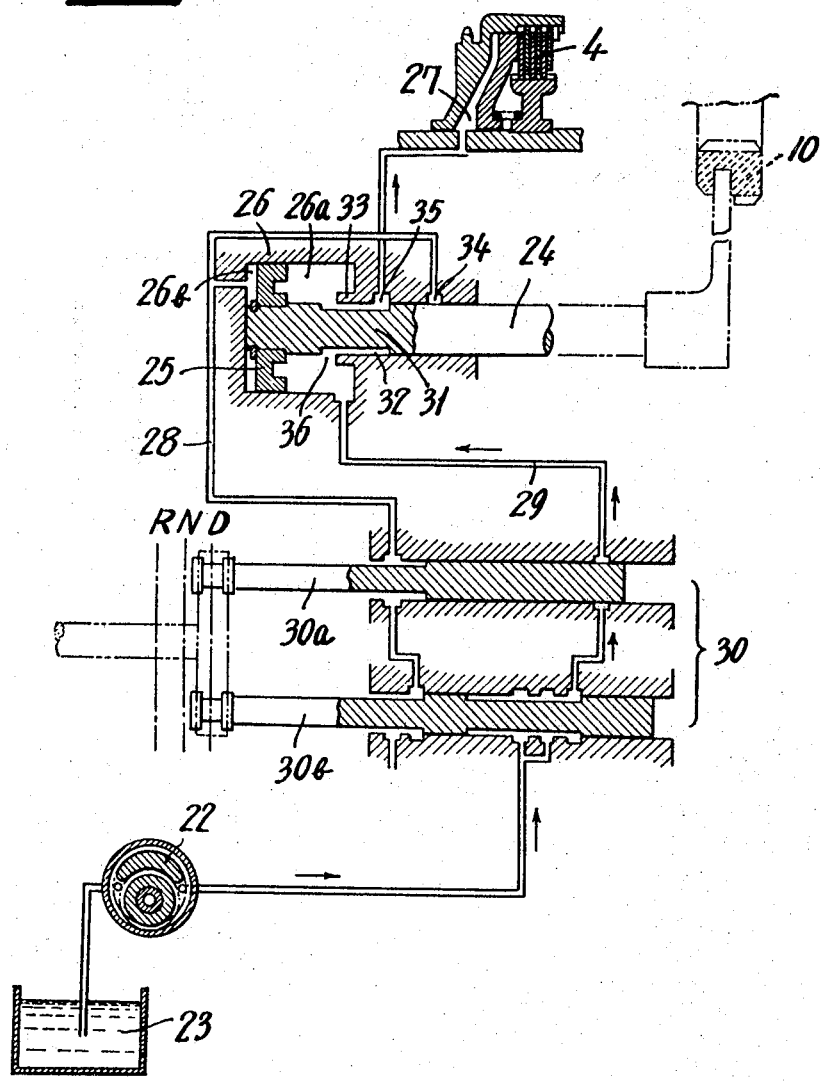

3,557,918

APPARATUS FOR CONTROLLING THE OPERATION OF A SHIFT MEMBER AND INPUT CLUTCH IN A GEAR TYPE TRANSMISSION

BRIEF SUMMARY OF THE INVENTION

This invention relates to an apparatus which utilizes a pressure fluid to operate both a shift member such as a shift gear, or the like, in a gear-type transmission and an input clutch for connecting said transmission with a driving source such as an internal combustion engine or the like.

It is required in this kind of apparatus that a pressure fluid be applied first to the shift member for operating the same and then applied to the clutch for operating the same. If the clutch is first operated by mistake by being supplied with the pressure fluid, not only does it become difficult for the shift member to shift but also the shift member and the cooperating members are liable to be damaged.

An object of this invention is to provide an apparatus whereby such successive supply of pressure fluid can be effected automatically and positively, and the invention is characterized in that an operation cylinder for a shift member and an operation cylinder for an input clutch are in communication with a pressure fluid source through a first passage and a second passage respectively, and a manually operable valve is interposed in the first passage to control supply of pressure fluid to the operation cylinder of the shift member, a valve being provided in the second passage to automatically open near the end of the shift movement of the shift member.

BRIEF DESCRIPTION OF THE DRAWING

FIG. 2 is a diagram showing a fluid circuit of one example of the apparatus, and FIGS. 3 and 4 are diagrams of the circuit in different respective operating conditions.

DETAILED DESCRIPTION

Figure 1:
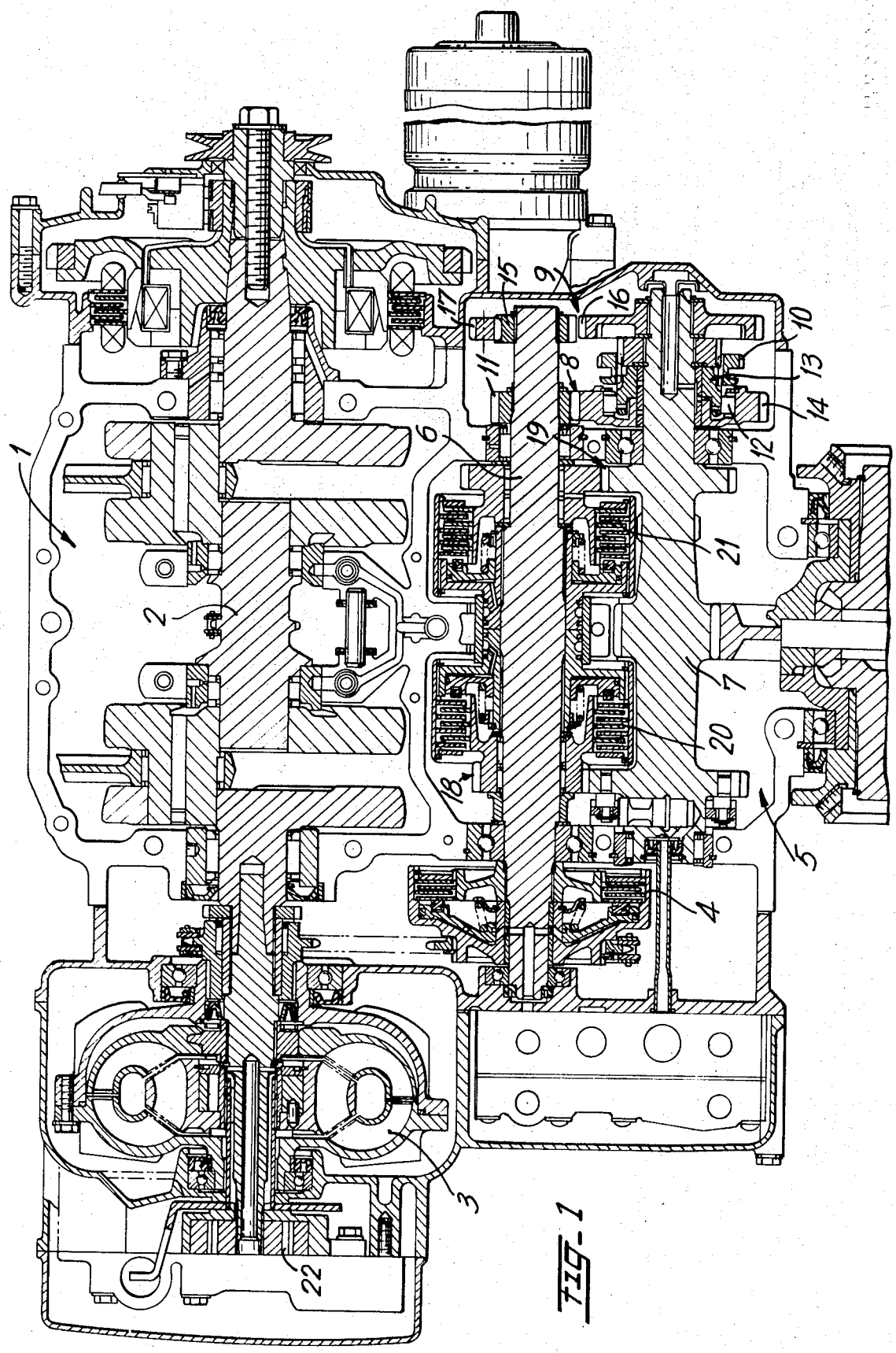
FIG. 1 is a sectional plan view of a gear-type transmission provided with the apparatus of this invention.

Referring to the drawing, numeral 1 denotes an internal combustion engine, and a crank shaft 2 of the engine is connected through a torque converter 3 and an input clutch 4 to a gear transmission apparatus 5. The gear transmission apparatus 5 comprises an input shaft 6, and an output shaft 7 parallel thereto. A first transmission system 8 for forward movement and a second transmission system 9 for reverse movement are interposed in parallel between the two shafts 6 and 7, so that when a shift member 10 is moved to the left and the right, respectively, in the drawing the transmission systems 8 and 9 are selectively operated. The first transmission system 8 comprises a gear 11 fixedly mounted on the input shaft 6 and a one-way clutch 12 loosely mounted on the output shaft 7, and the clutch 12 comprises an inner member 13, and an outer gear member 14 in mesh with said gear 11. The second transmission system 9 comprises a gear 15 fixedly mounted on the input shaft 6, a gear 16 loosely mounted on the output shaft 7 and an intermediate gear 17 in mesh with the two gears 15 and 16. The shift member 10 is of the shift clutch type in splined engagement with the output shaft 7 and if member 10 is moved respectively to the left and the right, the member 10 is selectively brought in engagement with the inner member 13 and the gear 16 for selectively operating the respective transmission systems 8 and 9. There are additionally provided between the two shafts 6 and 7 a third transmission system 18 for low speed and a fourth transmission system 19 for high speed. The systems 18 and 19 are in parallel so that they may be selectively operated in accordance with the operation of their corresponding frictional clutches 20 and 21, but this portion has no relation to the present invention and detailed explanation thereof is therefore omitted.

According to this invention, it is intended that both the input clutch 4 and the shift member 10 be operated by a pressure fluid, and for this purpose an oil pressure pump 22 driven by the engine 1 serves as a pressure fluid source, the pump 22 being connected on its suction side to a reservoir 23.

A piston rod 24 has the shift member 10 connected to one end thereof and a piston 25 connected to the other end, the piston being slidably mounted in a cylinder 26 which constitutes an operation cylinder for the shift member 10. The input clutch 4 is provided with an oil pressure operating cylinder 27 in a well-known manner.

The body containing the cylinder 26 is provided with passages 28 and 29 which are in communication with respective chambers 26b and 26a of the cylinder 26 formed on opposite sides of the piston 25, so that when a manually operable valve 30 is moved from the neutral position N in FIG. 2 to a reverse position R as shown in FIG. 3, the passage 28 is placed into communication, through valve 30, with the oil pressure pump 22 and the passage 29 is placed into communication, through valve 30, with the reservoir 23, whereas when the valve 30 is moved to a forward position D as shown in FIG. 4, the connection of the two passages 29 and 28 are reversed. Thus, if the valve 30 is moved to the left in the drawing (R position), the oil passage 28 becomes the high-pressure side, so that the piston 25 is moved to the right to cause the piston rod 24 and the shift member 10 to move to the right to engage the first transmission system 9 at the right side in FIG. 1, whereas if the valve 30 is moved to the right in the drawing (D position), the passage 29 becomes the high-pressure side, so that the piston 25 is moved to the left to cause the piston rod 24 and the shift member 10 to move to the left to engage the second transmission system 8 on the left side in FIG. 1.

A valve which automatically opens near each end of the left and right movements of the shift member 10 to then feed cylinder 27 of clutch 4 is constituted as follows:

The piston rod 24 moving with the shift member 10 is formed at its center with a valve portion 31 having at its periphery an annular groove 32, and the valve portion 31 is positioned slidably within a peripheral valve chamber 33. The valve chamber 33 is provided with a right-hand valve opening 34 in communication with the passage 28, an intermediate valve opening 35 in communication with the operation cylinder 27 for the input clutch 4, and a left-hand valve opening 36 in communication through the chamber 26a with the passage 29. The openings 34, 35, 36 are equally spaced along the length of chamber 33 and the groove 32 has a length slightly greater than the spacing between respective openings. As described before, the piston 25, the piston rod 24 and the shift member 10 are moved to the right in the drawing if the valve 30 is moved to the left as shown in FIG. 3, however, when rod 24 approaches its end of movement, the groove 32 provides communication between the valve openings 34 and 35, whereby the operation cylinder 27 is placed into communication with the passage 28 of the high-pressure side for commencing operating of the clutch 4. As also described before, if the valve 30 is moved to the right as shown in FIG. 4, the passage 29 becomes the high-pressure side, whereby the piston 25, the piston rod 24 and the shift member 10 are moved to the left, and as the rod 24 approaches the end of its movement, the groove 32 provides communication between the valve openings 35 and 36, whereby the operation cylinder 27 is placed into communication with the high-pressure side for commencing operation of clutch 4.

In the illustrated embodiment, the manually operable valve 30 is composed of two valve rods 30a and 30b, but the valve 30 can be modified to be formed of a single valve rod.

Thus, according to this invention, with only a single operation of the manually operable valve, it is automatically achieved that the pressure fluid is first supplied to the shift member for operating the same and then near the end of displacement of such shift member, the input clutch is supplied with the pressure fluid for being operated. Thus a situation can never occur in which the pressure fluid is first supplied to the clutch for operating the same by mistake and thereby the transmission operation is positively safeguarded against accident and potential damage.

We claim:

1. Apparatus for the operational control of a shift member and an input clutch in a gear-type transmission, said apparatus comprising an operation cylinder for the shift member and an operation cylinder for the input clutch, a pressure fluid source, means providing a first passage and a second passage leading respectively to the operation cylinder for the shift member and the operation cylinder for the input clutch, manually operable valve means interposed in the first passage for selectively providing communication between the pressure fluid source and the operation cylinder of the shift member, the shift member being displaced by the pressure fluid from said source when the manually operable valve means is in active position and the source is in communication with the operation cylinder of the shift member, second valve means in said second passage for controlling flow of pressure fluid to said operation cylinder for said input clutch, the second valve means being operatively associated with said shift member to be automatically opened near the end of the displacement of the shift member whereby the input clutch will be operated subsequent to the shift member, a slidable piston in said operation cylinder for the shift member, a rod connecting said piston and shift member, said piston being subjected to said pressure fluid, with the manually operable valve means in active position, to be displaced thereby and thus cause displacement of the shift member, said second valve means being constituted by a portion of said rod having a peripheral groove providing communication to said second passage for the pressure fluid as the rod is displaced and the shift member approaches the end of its displacement, means providing a third passage leading to the operation cylinder for the shift member, the first and third passages opening into the operation cylinder for the shift member on opposite sides of said piston, said manually operable valve means being constructed to selectively connect the first and third passages to said source whereby the piston is double acting and the shift member can be displaced in opposite directions to two operative positions, and a valve chamber separate from said operation cylinders slidably accommodating said portion of the rod with the peripheral groove, said valve chamber having a first opening leading to one of said first and third passages, a second opening leading to said second passage, and a third opening leading to the other of said first and third passages, said openings being equally spaced apart in the direction of displacement of the rod, said groove being of a length slightly exceeding said spacing whereby the second passage is alternately placed into communication with the first and third passage when the rod approaches its end of stroke positions corresponding to the operative positions of the shift member.

2. Apparatus as claimed in claim 1 wherein one of said first and third openings opens directly into said operating cylinder for the shift member.